United States Patent [19]

Kawasaki

[11] 3,845,360

[45] Oct. 29, 1974

[54] LIGHT-MEASURING CIRCUITS

[75] Inventor: Masahiro Kawasaki, Tokyo, Japan

[73] Assignee: Asahi Kogaku Kogyo Kabushiki Kaisha, Tokyo-to, Japan

[22] Filed: Mar. 21, 1973

[21] Appl. No.: 343,384

[30] Foreign Application Priority Data

Mar. 20, 1972 Japan .............................. 47-31992

[52] U.S. Cl. .............. 317/124, 95/10 CT, 250/206, 317/148.5 B

[51] Int. Cl. .......................................... H01h 47/24

[58] Field of Search .................. 317/124, 148.5 SB; 95/10 CT; 250/200, 206; 356/224, 226; 340/347 AD; 315/154

[56] References Cited

UNITED STATES PATENTS 3,603,799 9/1971 Nobusawa ................. 95/10 CT UX

*Primary Examiner*—J. D. Miller
*Assistant Examiner*—Harry E. Moose, Jr.
*Attorney, Agent, or Firm*—Steinberg and Blake

[57] ABSTRACT

A light measuring circuit including at least a pair of electronic switch elements, such as SCR's, for assuming conductive or non-conductive states, depending upon whether an input to each is above or below a given magnitude. A photosensitive input, which responds to the light which is to be measured, is electrically connected with each electronic switch element and a reference voltage input is also electrically connected with each electronic switch element, so that each of the latter elements receives an input which is a combination of the reference voltage input and the photosensitive input corresponding to the light intensity. One of these inputs is stepped from one electronic switch element to the next while the other is constant, and thus in accordance with the magnitude of the input each electronic switch element will remain in a non-conductive state or will assume a conductive state. An output is electrically connected with both of the electronic switch elements for transmitting therefrom an output which is determined by whether either one or both of the electronic switch elements are in the conductive or non-conductive state.

10 Claims, 3 Drawing Figures

LIGHT-MEASURING CIRCUITS

BACKGROUND OF THE INVENTION

The present invention relates to light-measuring circuits.

In particular, the present invention relates to light-measuring circuits which are adapted to be used in photography. Thus, the light-measuring circuit of the invention may be used either as part of a camera circuit for automatically determining the exposure time, or the light measuring circuit of the invention may be used for a purpose such as indicating whether or not additional flash illumination is required in order to make a proper exposure with a camera.

Conventional systems for measuring light for purposes such as those referred to above are based upon integration of the amount of light which is sensed. With such systems complex circuitry is essential in order to bring about triggering of a switch responsive to voltage across an integration capacitor, with this response operating as a result of retaining of the integrated voltage.

SUMMARY OF THE INVENTION

It is a primary object of the present invention to provide light-measuring circuits which will avoid the complexities and other disadvantages of conventional light-measuring systems which operate according to an integration principle.

Thus, it is an object of the present invention to provide a digital type of light-measuring circuit.

In particular, it is an object of the present invention to provide a circuit of this type which is far simpler than conventional light-measuring circuits.

Furthermore, it is an object of the present invention to provide a light-measuring circuit which can achieve an indication of the instantaneous illumination at an object which is to be photographed.

Thus, one of the objects of the present invention is to provide a light-measuring circuit of the above type which can indicate whether or not flash illumination is required.

Also it is an object of the present invention to provide a light-measuring circuit which can form part of a shutter-controlling camera circuit to determine exposure time automatically.

According to the invention the light-measuring circuit includes at least a pair of electronic switch means for assuming conductive or non-conductive states, each of these electronic switch means assuming one of these states when an input thereto is above a given magnitude and the other of these states when an input thereto is below this magnitude. A photosensitive input means for responding to light which is to be measured is electrically connected with both of the electronic switch means for transmitting thereto input signals corresponding to the light received by the photosensitive input means. A reference voltage input means is electrically connected with both of the electronic switch means for transmitting reference voltage input signals thereto, so that in this way each of the electronic switch means receives an input resulting from the combination of the signal from the photosensitive input means and the signal from the reference voltage input means. One of these input means transmits a constant signal to both of the electronic switch means, while the other of these input means transmits to both of the electronic switch means stepped signals which differ one from the next by a given increment. In this way, both of the electronic switch means may become conductive or non-conductive, or one of the electronic switch means will assume a conductive state while the other remains in its non-conductive state. An output means is electrically connected with both of the electronic switch means for transmitting therefrom an output signal determined by whether either one or both of the electronic switch means are in the conductive or non-conductive states.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
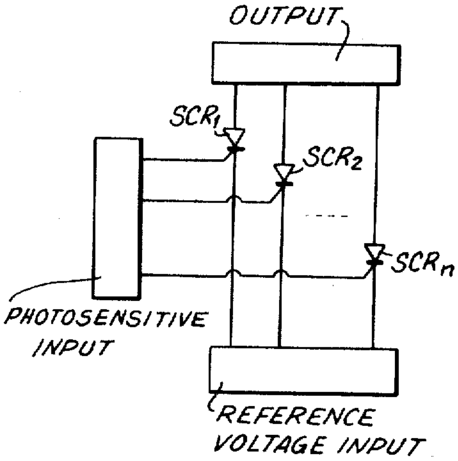
FIG. 1 is a schematic representation of a light-measuring circuit according to the invention, FIG. 1 illustrating the principle according to which the light-measuring circuit of the invention operates.

Referring first to FIG. 1 which schematically illustrates the principle of the present invention, it will be seen that the light-measuring circuit of FIG. 1 includes a plurality of electronic switch means in the form of a series of SCR's (silicon controlled rectifiers). Thus, FIG. 1 illustrates the series of SCR's $SCR_1$, $SCR_2$ . . . , $SCR_n$. A photosensitive input means, designated by the photosensitive input block, is electrically connected to the gates of the several SCR's. This photosensitive input means will respond in a known way to the light which is to be measured such as artificial flash illumination, steady light, whether natural or artificial, or a combination of artificial and available light. Thus, input signals in accordance with the intensity of the light received by the photosensitive input means will be electrically transmitted to the gates of the several SCR's.

The cathodes of the series of SCR's, which form the series of electronic switch means of FIG. 1, are electrically connected with a reference voltage input means indicated by the block at the bottom of FIG. 1. This reference voltage input means will, in a manner described below, provide stepped reference voltage inputs to the cathodes of the several electronic switch means. Thus, in the illustrated example the reference voltage input to $SCR_2$ will differ from the reference voltage input to $SCR_1$ by a given increment, and this same increment will prevail in the reference voltage input signals from one SCR to the next. Therefore, the input to each electronic switch means is determined by a combination of the input from the photosensitive input means and the input from the reference voltage input means. Thus, in response to a given light amount sensed by the photosensitive input means, the electronic switch means $SCR_1$ . . . , $SCR_K$ ($1 \leq K \leq n$), which have gate-cathode voltages which, as a result of the reference voltages, are capable of turning the electronic switch means on, or in other words rendering them conductive, constitute a conductive group of the series of electronic switch means. The output means designated by the block at the upper part of FIG. 1 is electrically connected with the anodes of the several SCR's, and this output means will transmit a signal determined by the group of SCR's which become conductive, and this output signal may be used for memory purposes, to be stored for further use in determining exposure time, for example, or the signal may be used simply as an indication of light intensity, for the purpose of indicating, for example, whether or not additional flash or artificial illumination is required.

Figure 2:
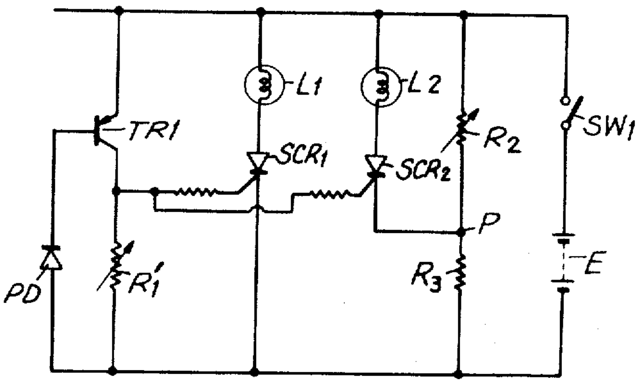
FIG. 2 illustrates schematically details of a light-measuring circuit of the invention capable of indicating whether or not flash illumination is required.

Referring to FIG. 2, a practical circuit of this latter type is illustrated. The photosensitive input means includes circuit components for transforming light intensity into a corresponding electrical signal. This photosensitive input means of FIG. 2 includes the amplifying transistor TR1 having collector and emitter electrodes which are electrically connected into the circuit which includes the current source E, the circuit also including the current source switch $SW_1$, which is closed when the circuit is to be rendered operative. At its collector side the transistor TR1 is provided with a load resistor $R_1$. The photosensitive input means further includes, in the illustrated example, a photodiode PD connected electrically between the base electrode of the transistor TR1 and the negative pole of the current source E.

The photosensitive input means constituted by the above elements of FIG. 2 is electrically connected with the gates of the illustrated pair of electronic switch means formed by the SCR's $SCR_1$ and $SCR_2$. The output means of this embodiment is in the form of a current control circuit including the lamps $L_1$ and $L_2$ which are respectively connected in series with the electronic switch means $SCR_1$ and $SCR_2$, in particular to the anodes thereof as illustrated. The cathode of $SCR_2$ is electrically connected to the junction P between resistors $R_2$ and $R_3$ of a bleeder circuit which is also connected to the current source E as illustrated in FIG. 2. Through this bleeder circuit, whose resistor $R_2$ is variable, it is possible to transmit to the cathode of $SCR_2$ a reference voltage which differs from the reference voltage applied to the cathode of $SCR_1$ by a given increment, so that in this way the stepped reference voltage inputs are achieved.

The above light-measuring circuit of FIG. 2 is capable of discriminating so as to give an indication as to the possibility of obtaining a proper exposure by way of a flash structure which automatically controls the amount of flash illumination in accordance with the lighting conditions at the object to be photographed, the distance to the object to be photographed, and the photographic settings of the camera such as the film speed setting, in accordance with the speed of the film which is in the camera, and the diaphragm setting.

With a flash structure which is capable of automatically varying the amount of flash illumination, there is a given range of variable flash illumination. This range is limited by the maximum flash illumination which can be provided by the flash structure as well as by the efficiency of the response of the flash structure with respect to the adjustment of the amount of light. Therefore, to carry out an exposure with such flash structure it is essential to confirm initially whether the conditions under which the exposure is to be made is within the capability of the controlled range of possible flash illumination which can be provided. In other words it is essential to determine initially whether or not it is possible to make a proper exposure with the particular flash structure.

When the object which is to be photographed is illuminated by such a flash structure, the light reflected from the object is received by the photodiode PD. It may be assumed in this connection that the range of variable light which can be provided by the flash structure will have a minimum light amount A capable of being received by the photodiode PD and a maximum light amount B capable of being received by the photodiode PD, and the limit values of current flowing through the photodiode PD with the light amounts A and B received thereby being respectively $i_A$ and $i_B$. Then, the voltages produced across the resistor $R'_1$ are:

With received light amount A: $V = V_A = i_A \times h_{FE} \times r_1$

With received light amount B: $V = V_B = i_B \times h_{FE} \times r_1$ where $h_{FE}$ is the d.c. amplification factor of TR1 and $r_1$ is the resistance value of resistor $R_1$. When the resistance values $r_1$ and $r_2$ (the resistance value of resistor $R_2$) are so adjusted that $V_A = V_{GT}$, where $V_{GT}$ is the trigger gate voltage of each SCR, and $V_B = V_{GT} + V_{cc}r_3 / (r_2 + r_3)$, where $r_3$ is the value of resistor $R_3$ and $V_{cc}$ is the voltage of the d.c. source E, then, if the received light amount is less than A both of the electronic switch means $SCR_1$ and $SCR_2$ will not be triggered and the lamps $L_1$ and $L_2$ will not become illuminated.

On the other hand, if the amount of light received by the photodiode PD of the photosensitive input means is greater than A but smaller than B, then the electronic switch means $SCR_1$ will be triggered to assume its conductive state and the lamp $L_1$ will be illuminated. Lamp $L_2$ will not be illuminated since the electronic switch means $SCR_2$ does not assume its conductive state.

If the amount of light received by the photodiode is greater than B, then both of the electronic switch means $SCR_1$ and $SCR_2$ will assume their conductive states and both of the lamps $L_1$ and $L_2$ will become illuminated. As a result of the current-retaining characteristics of the electronic switch means $SCR_1$ and $SCR_2$, the lamps $L_1$ and $L_2$ will remain illuminated until the current source switch $SW_1$ is opened, this carrying out a memory operation.

Thus, with the structure of FIG. 2 it becomes possible to determine whether or not the flash structure should be operated and if so whether the flash structure can provide the required illumination. In other words if both of the lamps $L_1$ and $L_2$ are illuminated it is known that flash illumination is not required, if both of the lamps are not illuminated it is known that the flash structure cannot provide sufficient illumination, while if the lamp $L_1$ is illuminated while the $L_2$ is not illuminated it is known that the flash structure should be operated and that it will be capable of providing sufficient additional illumination to achieve a proper exposure.

The circuitry of FIG. 2 can also be used with variable light such as daylight. Assuming that the circuitry of FIG. 2 is to be used in a camera capable of automatically controlling the extent of exposure by adjusting the values of resistors $R'_1$, $R_2$ and $R_3$, the operator can determine from the circuitry of FIG. 2 the upper and lower limit values of the brightness at the object to be photographed in connection with the range of possible automatic exposure control which can be achieved. Thus, when operating with natural light received by the photodiode PD, under these conditions, the fact that both lamps $L_1$ and $L_2$ are not illuminated will indicate that additional artificial illumination is necessary while if only the lamp $L_1$ is illuminated, there is an indication that the variable natural illumination is sufficient for a proper exposure. Illumination of both lamps $L_1$ and $L_2$ is an indication that the amount of natural light is too intense for a proper exposure.

Figure 3:
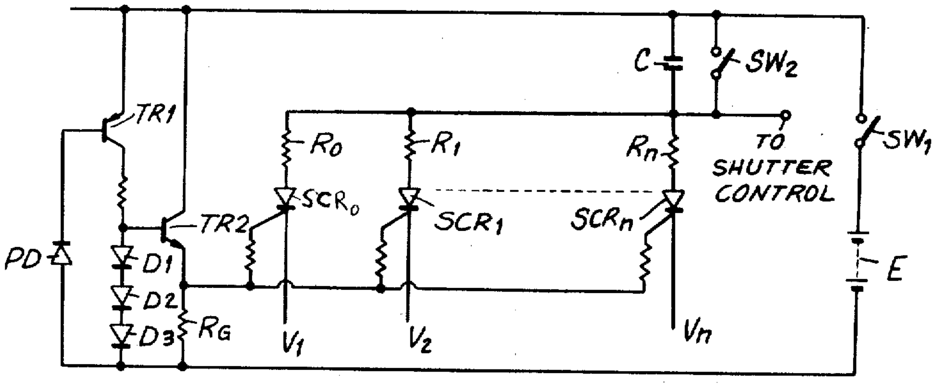
FIG. 3 is a more detailed illustration of a circuit according to the invention which can form part of a circuit of a camera for automatically determining exposure time, for example.

FIG. 3 illustrates the circuitry of the present invention when utilized to form part of a circuit for automatically controlling a shutter, for example, the circuitry of FIG. 3 being capable of use either in connection with natural light or artificial light. Thus, in this case also the photosensitive input means includes a photodiode PD which will respond to the light at the object to be photographed, with the circuitry of FIG. 3 being used to determine the exposure time. Those elements of FIG. 3 which have the same reference characters as corresponding elements of FIG. 2 perform in the same way as described above in connection with FIG. 2. In the example of FIG. 3 the collector circuit of the transistor TR1 is connected electrically to the series-connected diodes $D_1$, $D_2$, and $D_3$, these diodes serving to transform the received light information into a logarithmically compressed electrical signal. A transistor TR2 forms a buffer element having a load resistor $R_G$ connected into its emitter circuit. The voltage across the resistor $R_G$ is applied to the gates of the series of electronic switch means formed by the SCR' s $SCR_0$, $SCR_1$ . . . , $SCR_n$. In this way the photosensitive input means of FIG. 1 transmits input signals to the gates of the series of electronic switch means. Load resistors $R_0$, $R_1$ . . . , $R_n$ of different or equal values are connected in series, respectively, to the anodes of the series of electronic switch means and form part of the output means. Different reference voltage inputs $V_1$, $V_2$, . . . , $V_n$, (with respect to the logarithmically compressed voltage across the resistor $R_G$, in the form of voltages which increase according to predetermined steps or increments) are applied to the cathodes of the series of SCR's, respectively. The stepped voltages can be achieved by way of suitable bleeder circuits as described above in connection with FIG. 2, and the arrangement is such that each pair of successive cathodes of the series of electronic switch means receive reference voltage inputs which differ from one to the next by a predetermined increment so that the increment of voltage change from one reference voltage to the next remains constant.

All of the load resistors $R_0$, $R_1$, . . . , $R_n$ are electrically connected to a capacitor C which also forms part of the output means so that in this way each of the load resistors is connected in series with the capacitor, and the series connected load resistor and capacitor are of course connected to the anode of each SCR to form an output means therefor. The capacitor C is bridged by the switch $SW_2$ which is connected in parallel across the capacitor C. As is indicated in FIG. 3, the junction between the capacitor C and each of the several load resistors $R_0$, $R_1$, . . ., $R_n$ is connected to a contact leading to a shutter-control circuit which may be a circuit controlled by the capacitor C which constitutes a timing capacitor. In other words it is well known to connect such a capacitor to a circuit which will trigger a circuit in order to deenergize an electromagnet which will permit the shutter of a camera to close when the charge at the capacitor C reaches a given value. Assuming that the current source switch $SW_1$ is closed, when the photodiode PD receives the light from the object to be photographed, a photocurrent flows through the base of transistor TR1 so that a logarithmically compressed voltage is produced by the diodes $D_1$, $D_2$, and $D_3$. This voltage appears through the buffer transistor TR2 across the load resistor $R_G$. If in connection with one or more of the SCR's, this latter voltage minus the trigger gate voltage is greater than the cathode voltage, then such SCR's will become triggered and will assume a conductive state. Then, when the switch $SW_2$ is opened, as by continued downward movement of a shutter-tripping plunger of the camera or by upward swinging of a mirror of a single lens reflex camera, the current which flows into capacitor C is the sum of the currents which are restricted by the load resistors $R_0$, $R_1$, . . . of the several electronic switch means which have been triggered into the conductive state. This charge is proportional to the photocurrent. A time control can be carried out by means of the voltage across the capacitor C, in a well known manner as described above.

If it is assumed that a voltage $V_G$ is produced across the resistor $R_G$, that the trigger gate voltage is $V_{GT}$, that the load resistor value of $SCR_K$ $(0 \leqq K \leqq n)$ is $R_K$, and that the cathode voltage is $V_K$ and $V_K + 1 > V_G - V_{GT} \geqq V_K$, then the elements $SCR_0{\sim}_K$ whose cathode voltages are $V_0$ to $V_K$ become conductive, and the resistors which determine the charging of capacitor C are the load resistors $R_0$, $R_1$, . . . , $R_K$. If the relationship between the load resistors is $R_0 = R_1$ and $R_{K+1} = R_K \times 1/2$, then if the amount of light is doubled the current charging the capacitor C is also doubled.

Accordingly, if the arrangement is such that the short-circuiting or bridging switch $SW_2$ is opened in synchronism with opening of the shutter, then the control of the exposure time can be carried out utilizing for this purpose the time which is required for charging the capacitor C up to a predetermined value as the information which controls the time during which the shutter is maintained open.

If the arrangement is such that the current source switch $SW_1$ is kept closed for a predetermined time duration (in the case of an exposure with natural light) or for a predetermined time duration from the instant when the photodiode PD receives the artificial light (in the case of instantaneous illumination light), then the capacitor C is charged by a changing current in accordance with the amount of light which is measured. The corresponding information is memorized as the voltage across the capacitor, and this memorized information can be subsequently utilized when desired.

Thus, as pointed out above, with the light-measuring circuits according to the present invention, triggering voltages are applied across the gate-cathode signal input electrodes of the several electronic switch means which have the characteristic of retaining their conductive state, such as the SCR's referred to above, and in this case these voltages are applied to these electronic switch means with the latter arranged in parallel and in a multi-state manner with respect to the stepwise variation of the reference voltages from one to the next, so that the several electronic switch means will form conductive group and a non-conductive group.

While in the examples described above and shown in the drawings the stepped reference voltages are applied to the cathodes of the several SCR's, respectively, the arrangement may be varied in such a way that the reference voltages are applied to the gates and the signals corresponding to the light received by the photosensitive input means may be transmitted to the cathodes. Alternately, it is possible to provide a constant reference voltage signal for all of the several electronic switch elements while the received light is converted into signals which vary from one to the next in a stepwise manner according to a given increment, with these stepped signals corresponding to the light intensity then applied to the gates as illustrated or to the cathodes in the event that the constant reference voltage signal is applied to the several gates.

What is claimed is:

1. In a light-measuring circuit, at least a pair of electronic switch means each in the form of and SCR, for assuming and memorizing conductive or non-conductive states independently of each other each electronic switch means assuming one of said states when an input thereto is above a given magnitude and the other of said states when an input thereto is below said magnitude, photosensitive input means for responding to light which is to be measured, said photosensitive input means being electrically connected with both of said electronic switch means for transmitting thereto input signals corresponding to the light received by said photosensitive input means, reference voltage input means electrically connected with both of said electronic switch means for transmitting reference voltage input signals thereto, so that each electronic switch means receives an input resulting from the combination of the signal from said photosensitive input means and the signal from said reference voltage input means, one of said input means transmitting a constant signal to both of said electronic switch means and the other of said input means transmitting to both of said electronic switch means stepped signals which differ one from the next by a given increment, whereby both of said electronic switch means may become conductive or non-conductive or one of said electronic switch means will assume a conductive state while the other remains in its non-conductive state, and output means electrically connected with both of said electronic switch means for transmitting therefrom an output signal determined by whether either one or both of said electronic switch means are in said conductive or non-conductive states.

2. The combination of claim 1 and wherein there are a series of said electronic switch means each in the form of an SCR with said photosensitive input means and reference voltage input means each being electrically connected to each of said series of electronic switch means and with said other input means transmitting stepped input signals which differ one from the next by said given increment so that if only part of said electronic switch means assumes said conductive state the series of electronic switch means will form two groups one of which remains non-conductive and the other of which becomes conductive with said output means transmitting an output signal according to the number of electronic switch means in said groups.

3. The combination of claim 1 and wherein said other input means which transmits the stepped input signals is said reference voltage means.

4. The combination of claim 2 and wherein said other input means which transmits said stepped input signals is said reference voltage means.

5. The combination of claim 1 and wherein said output means includes a pair of lamps respectively connected electrically with said electronic switch means for becoming illuminated or remaining non-illuminated to indicate when an electronic switch means assumes a conductive state.

6. The combination of claim 1 and wherein said output means includes a capacitor which becomes charged in accordance with the response of said pair of electronic switch means.

7. The combination of claim 2 and wherein said output means includes a capacitor which becomes charged in accordance with the number of electronic switch means which assume a conductive state.

8. The combination of claim 1 and wherein each SCR has a gate to which said photosensitive input means is electrically connected, a cathode to which said reference voltage input means is electrically connected, and an anode to which said output means is electrically connected.

9. The combination of claim 2 and wherein each SCR has a gate to which said photosensitive input means is connected, a cathode to which said reference voltage input means is electrically connected, and an anode to which said output means is electrically connected, said reference voltage input means providing said stepped inputs.

10. The combination of claim 9 and wherein said output means includes a series of load resistors respectively connected electrically to said anodes and a capacitor to which all of said load resistors are electrically connected so that the capacitor will become charged according to the number of SCR's which become conductive.

* * * * *